United States Patent Office 2,807,654
Patented Sept. 24, 1957

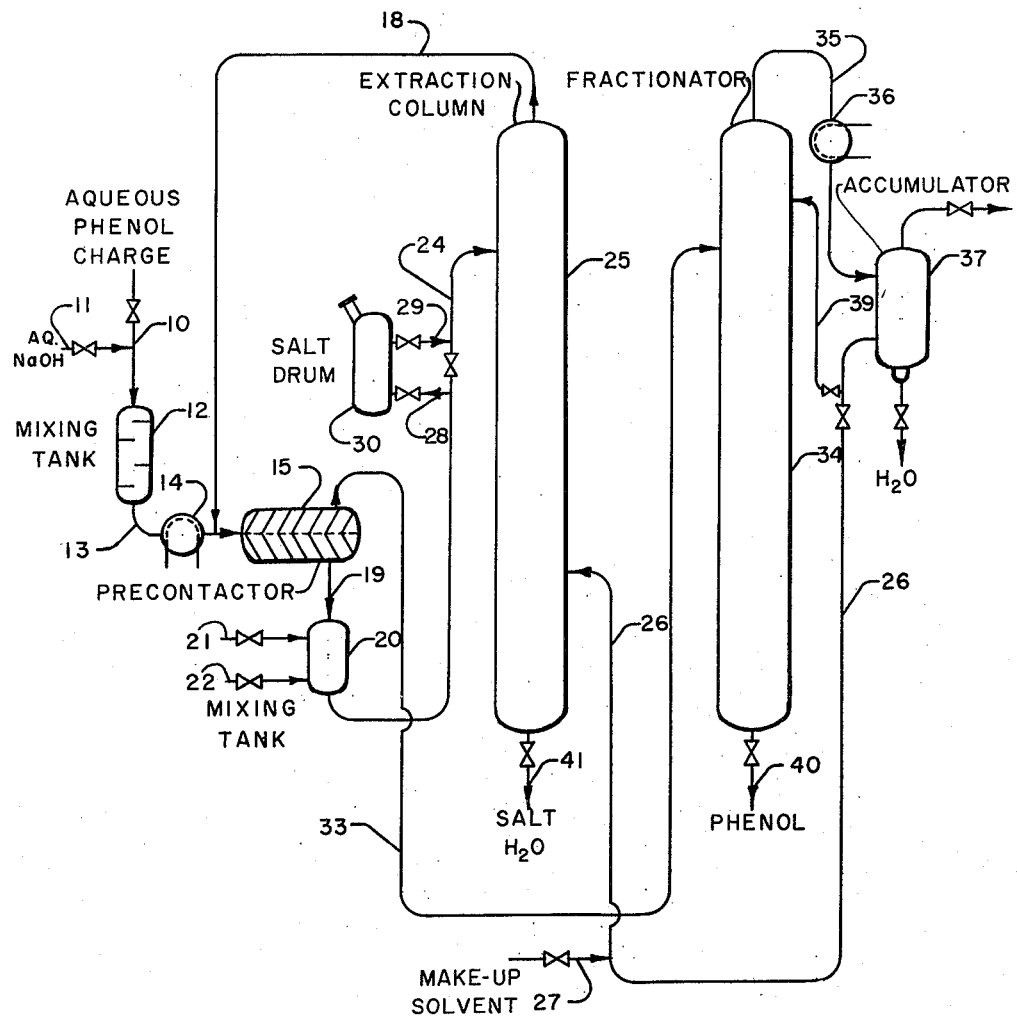

2,807,654

PROCESS FOR EXTRACTION OF PHENOL FROM AQUEOUS MIXTURES

Howard L. Grimmett, Palos Verdes Estates, and Elmer A. Anderson, El Cerrito, Calif., assignors to Shell Development Company, New York, N. Y., a corporation of Delaware Application September 13, 1955, Serial No. 533,957

9 Claims. (Cl. 260—627)

This invention relates to the recovery of phenol from mixtures comprising phenol in the form of aqueous solutions thereof. The invention relates more particularly to a process enabling the more efficient removal of phenol from industrial phenol-containing waste waters.

Aqueous phenol is obtained in many industrial operations wherein phenol is encountered as a reactant, an intermediate product, a desired end-product, or as an undesired by-product. Practical scale operation of processes involving the production of phenol-containing aqueous mixtures generally requires the recovery of the phenol from such aqueous mixtures produced. Not only is such phenol recovery directed to the obtaining of the bulk of the phenol for further use but to reducing to a minimum the phenolic content of the residual waste water. Because of the toxic nature of phenol, its concentration in off-water from an industrial operation must be kept exceedingly low, for example, below about 0.5 part per million. The recovery of phenol from such aqueous phenolic solutions with simultaneous reduction of the residual phenol to substantially no more than a trace amount under conditions of cost and operations commensurate with practical scale operation, is generally rendered exceedingly difficult if not impossible by methods disclosed heretofore. Disadvantages often encountered in processes available heretofore militating against efficient phenol recovery comprise additionally those attributable not only to complexity of operative procedures, with consequent high cost, but to difficulties resulting from the unavoidable formation therein of emulsions which are difficult to resolve and the presence of mixtures of extremely corrosive nature.

It is an object of the present invention to provide an improved process enabling the more efficient recovery of phenol from mixtures comprising the phenol in admixture with water.

Another object of the invention is the provision of an improved process enabling the more efficient recovery of phenol from mixtures comprising the phenol in admixture with water with the simultaneous formation of an aqueous phase comprising no substantial amount of phenol.

Still another object of the invention is the provision of an improved process enabling the more efficient removal of phenol from industrial waste waters with a minimum of operative steps and with the formation of an equeous phase containing substantially no more than trace amounts of phenol.

A specific object of the invention is the provision of an improved process enabling the more efficient removal of phenol from acidic aqueous solutions thereof with the formation of an aqueous phase containing no more than about 0.5 part per million of phenol. Other objects and advantages of the invention will become apparent from the following description thereof made with reference to the attached drawing wherein the single figure represents a more or less diagrammatical elevational view of one form of apparatus suitable for carrying out the process of the invention.

It has now been found that phenol is recovered more efficiently from aqueous solutions thereof with a minimum of operative steps, and with the formation of an aqueous phase containing substantially no more than trace amounts of residual phenol, by a sequence of steps comprising: contacting said aqueous mixture in a precontacting zone with an organic solvent-containing extract phase emanating, as described herein, from an extraction zone within the system, thereby forming an organic phase containing phenol in admixture with organic solvent and an aqueous phase comprising water and phenol in said precontacting zone, adjusting the pH of said aqueous phase to a pH below 9 and extracting it in the liquid phase with an organic solvent in an extraction zone, thereby forming an extract phase consisting essentially of phenol and organic solvent and an aqueous raffinate phase consisting essentially of water containing no more than trace amounts of phenol in said extraction zone, and introducing said extract phase into said precontacting zone to be used therein as said organic solvent-containing extract phase obtained within the system, and distilling phenol from said organic phase formed in said precontacting zone.

In a preferred modification of the invention the liquid phase extraction of said aqueous phase emanating from said precontacting zone is carried out in the presence of added sodium chloride.

The process of the invention is applied broadly to the separation of phenol from phenolic mixtures comprising phenol in admixture with water whatever the source of the phenolic mixtures. Thus, the process of the invention is applied to the recovery of phenol from phenol-containing aqueous solutions obtained, for example, in the manufacture of phenol or in the execution of chemical reactions involving the formation of aqueous phenol. The phenolic mixtures treated in accordance with the present invention need not be pure and may comprise contaminants ordinarily encountered in aqueous phenolic solutions of industrial sources. The process of the invention is applied with particular advantage to the treatment of acidic aqueous phenolic solutions. A particular advantage of the invention resides in the ability to remove efficiently substantially all phenol from aqueous phenol-containing mixtures independent of the amount of phenol originally present in the mixture. In the processing of relatively concentrated solutions a substantial part of the phenol may be removed initially by conventional distillation means. The process lends itself, however, with particular advantage to the removal of substantially all of the phenolic constituents from industrial waste waters containing a concentration of phenol below that capable of removal efficiently by ordinary distillation means. Thus, the aqueous phenol charged to the process of the invention may comprise less than, for example, about 20% by weight of phenol. It is to be understood, however, that the invention is in nowise limited with respect to the concentration of phenol in the aqueous mixture.

Referring to the drawing, an acidic aqueous phenolic mixture from which a substantial amount of phenol has been removed by conventional distillation means and which contains, for example, about 15 to 20% by weight of phenol and free HCl, is introduced into the system through a valved line 10. The aqueous phenolic charge thus entering the system through valved line 10 is brought to a hydrogen ion concentration below about 9, and preferably in the range of 7 to about 8.5 in terms of pH values, by the addition thereto of a suitable alkaline material, such as, for example, aqueous sodium hydroxide, introduced through valved line 11. Although sodium hydroxide is shown as the preferred material for neutralizing the entering acidic stream, it is to be pointed out that other alkaline materials such as, for example, sodium carbonate, potassium hydroxide, etc., may suitably be employed. Adjustment of the hydrogen ion concentration of the acidic charge is controlled to avoid a hydrogen ion concentration below a value of pH 5. At hydrogen ion concentrations above the prescribed limit, separation of a substantial amount of the phenolic content of the charge is generally not feasible. Below the minimum hydrogen ion concentration specified, corrosion is generally so severe as to render separation impractical.

After adjusting the hydrogen ion concentration of the acidic aqueous phenolic charge, it is discharged from line 10 into a suitable mixing zone, for example, a large tank or chamber, 12, wherein nuetralization by intimate mixing of the charge and added alkaline material takes place. Chamber 12 is provided with suitable agitating means such as, for example, stirrers or the like.

Subjection of such a charge directly to an extraction by conventional extraction means such as, for example, liquid-liquid extraction in a conventional extraction column, does not enable efficient removal of substantially all but trace amounts of the phenol from the aqueous charge. Inability to effect substantially complete removal of the phenol from the aqueous component in such an extraction column under conditions often employed heretofore is attributable, at least in part, to the fact that as a consequence of the degree of reduction of the phenol concentration in the direction of flow through the column, the hydrogen ion concentration generally unavoidably attains an order of magnitude in a portion of the column exceeding that at which residual amounts of phenol can be separated. Injection of an acidifying agent into the inlet of the column in sufficient amount to increased the pH at the opposite end thereof generally results in rates of corrosion and difficulties of product recovery militating against practical scale operation of the process. Injection of acidifying agents into an intermediate part of the column usually results in upsetting the normal conditions of resolution to an extent precluding separation to the desired degree of the phenolic constituent.

These difficulties are obviated in the process of the present invention by subjecting the phenolic charge to a pretreatment effecting the removal of the bulk of the phenol from the aqueous component of the charge, thereby simultaneously preparing a charge containing substantially all of the aqueous component introduced into the system and which pretreated charge is now capable of being freed of substantially all, except trace amounts, of the phenol in the absence of any substantial degree of corrosion under the conditions of liquid phase extraction prevailing in a subsequent extraction step of the process, as defined below.

Thus, the aqueous phenolic charge, after said adjustment of the hydrogen ion concentration thereof, is passed from mixing tank 12 through line 13, provided with heat exchanger 14, into a suitable precontacting zone. The precontacting zone may comprise a zone of enlarged cross-sectional area such as, for example, a precontactor chamber 15. Although a chamber 15 is shown as the preferred precontacting zone in the process of the invention, one or more such zones arranged in series or parallel may be used. Before entering precontactor 15, the aqueous phenolic charge flowing through line 13 is admixed with an organic solvent-containing extract phase emanating through line 18 from a liquid phase extraction step defined hereinbelow. Within precontacting chamber 15, the contents are permitted to stratify with the formation of a supernatant organic phase consisting essentially of organic solvent and phenol free of any substantial amount of water and a lower aqueous phase comprising water and phenol. The greater part of the phenol introduced into chamber 15 will be comprised in the organic phase formed therein. The aqueous phase will consist predominantly of a dilute solution of phenol. In addition to phenol and water, the aqueous phase will comprise substantially all of the sodium chloride formed as a consequence of the adjustment of the hydrogen ion concentration of the charge. Contents of the precontactor chamber 15 are maintained in the liquid phase. The contents of precontactor 15 are preferably maintained at a slightly elevated temperature such as, for example, a temperature above about 80° C. but below their boiling temperature under the prevailing conditions. Pressure in excess of atmospheric may be resorted to in order to maintain contents of precontactor 15 in the liquid phase. Temperature conditions within precontactor 15 are maintained within the desired range by means of heat exchanger 14 and, optionally, by other means not shown in the drawing for the introduction of heat into, or the withdrawal of heat from, the contents of precontactor 15.

The aqueous phase is passed from precontactor 15 through line 19 into a mixing zone such as, for example, a mixing tank 20. The hydrogen ion concentration of the contents of chamber 20 are brought within the pH range of 5 to 9, and preferably from 7 to 8.5, by the addition of a suitable acidic component, for example, a mineral acid such as HCl or, if required, an alkaline component such as, for example, aqueous sodium hydroxide. The invention is in nowise limited to the use of any specific acid or alkaline agent to effect the adjustment of the hydrogen ion concentration. Valved lines 21 and 22 are provided for the introduction of such acidic and/or alkaline adjusting agents into chamber 20. After adjusting the hydrogen ion concentration, the contents of chamber 20 consisting essentially of water, phenol and NaCl, are passed through line 24 into a suitable extraction zone such as, for example, an extraction column 25. It is to be stressed that essential to the attainment of the objects of the invention is such adjustment of the hydrogen ion concentration of the stream flowing from the precontactor 15 to extraction column 25.

Within column 25 the aqueous phenolic charge is subjected to extraction in the liquid phase with a suitable organic solvent such as, for example, diisopropyl ether, introduced into the lower part of column 25 by means of valved line 26. The extraction within column 25 is preferably executed at a moderately elevated temperature such as, for example, a temperature above about 120° F. but below the boiling temperature of the contents of the column. Pressures in excess of atmospheric pressure may be maintained within column 25 to assure the presence of the contents therein in the liquid phase.

Although diisopropyl ether is set forth as a preferred organic solvent for carrying out the liquid phase extraction within column 25, the invention is not limited to the use of this particular solvent and other organic solvents which have a preferrential solubility for phenol and are immiscible with the aqueous components within the column may suitably be employed. Examples of such other solvents comprise, for example, oxygen-containing solvents such as ethers, esters, ketones and the like; aromatic hydrocarbons, such as benzene etc.

In a preferred method of carrying out the process of the invention more efficient removal of all but trace amounts of phenol from the aqueous phase within column 25 is made possible by the introduction of sodium chloride into the column. A suitable method for adding the sodium chloride to the charge comprises the by-passing of a portion of the charge to the column from line 24 through a sodium chloride-containing salt drum 30. Valved lines 28 and 29 are provided enabling the passage of a portion of the stream from line 24 through drum 30. The amount of salt so added to the column may vary within the scope of the invention. It has been found that even small amount of salt addition improves to a substantial degree the distribution of phenol between aqueous salt solution and the diisopropyl ether. The maximum amount of salt which may be added is defined by the solubility of sodium chloride in the aqueous phase under the prevailing conditions. In general an amount of salt ranging, for example, from about 3 to about 20%, and preferably from about 5 to about 15% by weight is satisfactory.

The rate at which the tendency of phenol to distribute into the diisopropyl ether phase is increased with increase in salt content of the aqueous phase is illustrated by the following example:

EXAMPLE I

In three separate operations identified by the designations A, B and C, respectively, mixtures consisting essentially of water, phenol and diisopropyl ether were introduced into a stratification zone and therein allowed to stratify. Each of the three operations were conducted under substantially identical conditions with the exception that: in the operation "A" no salt was added to the stratification; in the run "B" 10% by weight of NaCl on a phenol-free basis was added; whereas in run "C" 20% by weight of NaCl was added. The aqueous and organic layers which formed upon stratification in each of the three operations were analyzed. The results obtained in each of the three operations in terms of the distribution constant are indicated in the following Table I:

Table I

| Run | Percent weight NaCl | K |
|---|---|---|
| A | 0 | 20 |
| B | 10 | 40 |
| C | 20 | 80 |

(K=ratio of concentration of phenol in solvent phase to concentration of phenol in aqueous phenol.)

Essential to the attainment of the advantages inherent in the addition of the salt to the extraction operation in the execution of the process of the invention is the maintenance of the contents of the extraction column 25 at a hydrogen ion concentration below 9 in terms of pH values.

Under the above-defined conditions there will be formed in the upper part of extraction column 25 an extract phase consisting essentially of diisopropyl ether and phenol in the absence of any substantial amount of water, and in the lower part thereof a raffinate phase consisting essentially of water and sodium chloride containing no more than trace amounts of phenol. The extract phase is passed from column 25 through line 18 into line 13 discharging into the precontactor 15. The extract phase emanating from column 25 is, therefore, used as the extract phase obtained within the system employed to effect phase separation within precontactor 15.

The organic phase separated in precontactor 15 is passed therefrom through line 33 into a suitable phenol recovery zone comprising, for example, a fractionator 34. Within fractionator 34 diisopropyl ether solvent is distilled from phenol with the formation of a vapor phase consisting essentially of diisopropyl ether and a liquid bottoms consisting essentially of phenol. The vapor phase consisting essentially of diisopropyl ether is passed from column 34 through line 35, provided with cooler 36, into accumulator 37. From accumulator 37, diisopropyl ether is passed through valved line 26 into extraction column 25. Make-up diisopropyl ether solvent is introduced into the system by means of valved line 27 discharging into the valved line 26. Liquid bottoms consisting essentially of phenol are withdrawn from the lower part of column 34 through valved line 40 and eliminated from the system as a final product. The raffinate phase, consisting essentially of water and sodium chloride free of any substantial amount of phenol, is eliminated from extraction column 25 by means of valved line 41 and eliminated from the system.

The process of the invention enables the maintenance of the phenol content of the water discharged from the system through valved line 41 in the range of only trace amounts, for example, below about 0.5 part per million.

EXAMPLE II

In a continuous phenol-recovery operation aqueous sodium hydroxide is added to a stream of acidic aqueous phenol consisting essentially of water, phenol and hydrogen chloride to bring the pH thereof in the range of 7 to 7.8. The resulting adjusted stream containing about 79% water, 15.5% phenol and 5.5% NaCl by weight, is introduced into a precontacting chamber. An extract phase, emanating from within the system as described below, consisting essentially of diisopropyl ether in admixture with phenol is charged to the precontacting chamber. Stratification of the contents of the precontacting chamber results in the formation of a supernatant organic phase consisting essentially of diisopropyl ether and phenol containing diisopropyl ether and phenol in a weight ratio of about 5.2 to 1, and a lower aqueous phase consisting essentially of water, phenol and NaCl in a weight ratio of water to phenol to NaCl of about 114:1:8.1, respectively. Aqueous phase is continuously withdrawn from the precontacting chamber and its pH adjusted to about 8.5 by the addition of aqueous sodium hydroxide thereto. Sufficient NaCl is then added to the adjusted aqueous phase to bring the NaCl content thereof to about 7% by weight. The resulting NaCl-containing adjusted aqueous phase is then subjected to liquid-liquid countercurrent extraction in an extraction column using diisopropyl ether as solvent. An extract phase consisting essentially of diisopropyl ether in admixture with phenol containing diisopropyl ether and phenol in a weight ratio of about 88 to 1 is formed in the upper part of the extraction column. A raffinate phase consisting essentially of water and sodium chloride and containing about 6.9% sodium chloride by weight and less than 0.5 part per million of phenol is formed in the lower part of the extraction column. The aqueous phase is withdrawn continuously from the lower part of the extraction column and eliminated from the system. The extract phase is passed continuously from the upper part of the extraction column into the precontacting chamber to be used therein as said extract phase obtained within the system. The organic phase formed by stratification in the precontacting zone is passed continuously from the precontacting chamber into a distillation column wherein diisopropyl ether is distilled as overhead from phenol bottoms. Phenol bottoms formed in the distillation consisting essentially of phenol having a purity of at least 98.5% are withdrawn continuously from the distillation column and eliminated from the system as a final product. The diisopropyl ether overhead from the distillation column is passed continuously from the distillation column to the extraction column to be used therein as the solvent for the liquid-liquid extraction.

We claim as our invention:

1. The process for dephenolating an aqueous phenol solution which comprises, contacting said aqueous phenol solution in a precontacting zone with diisopropyl ether containing extract phase obtained within the system, thereby forming an organic phase consisting essentially of diisopropyl ether in admixture with phenol free of any substantial amount of water and an aqueous phase consisting essentially of water and phenol in said precontacting zone, adjusting the hydrogen ion concentration of said aqueous phase to a pH in the range of from 5 to 9, subjecting said adjusted aqueous phase to a liquid-liquid countercurrent solvent extraction with an organic solvent consisting essentially of diisopropyl ether in an extraction zone, thereby forming an extract phase consisting essentially of diisopropyl ether in admixture with phenol free of any substantial amount of water and a raffinate phase comprising water substantially free of phenol in said extraction zone, passing said extract phase from said extraction zone to said precontacting zone to be used therein as said extract phase obtained within the system, and distilling phenol from said organic phase formed in said precontacting zone.

2. The process in accordance with claim 1 wherein the hydrogen ion concentration of the charge to the process is adjusted to a pH in the range of from 5 to 9.

3. The process for dephenolating an aqueous phenol solution which comprises, contacting said aqueous phenol solution in a precontacting zone with a diisopropyl ether-containing extract phase obtained within the system, thereby forming an organic phase consisting essentially of diisopropyl ether in admixture with phenol substantially free of water and aqueous phase comprising water substantially free of phenol in said precontacting zone, adjusting the hydrogen ion concentration of said aqueous phase to a pH in the range of from 7 to 8.5, subjecting said adjusted aqueous phase to liquid-liquid countercurrent extraction with diisopropyl ether in an extraction zone, thereby forming an extract phase consisting essentially of diisopropyl ether in admixture with phenol and a raffinate phase comprising water substantially free of phenol in said extraction zone, passing said extract phase from said extraction zone to said precontacting zone to be used therein as said extract phase obtained within the system, separately recovering by distillation in a distillation zone phenol and diisopropyl ether from said organic phase formed in said precontacting zone, and passing at least a part of said diisopropyl ether from said distillation zone to said extraction zone.

4. The process for dephenolating an aqueous phenol solution which comprises, contacting said aqueous phenol solution in a precontacting zone with diisopropyl ether-containing extract phase obtained within the system, thereby forming an organic phase consisting essentially of diisopropyl ether in admixture with phenol free of any substantial amount of water and an aqueous phase comprising water and phenol in said precontacting zone, adjusting the hydrogen ion concentration of said aqueous phase to a pH in the range of from 5 to 9, adding sodium chloride to said adjusted aqueous phase in a controlled amount to result in a concentration of sodium chloride in the range of from about 3 to about 20% by weight in said aqueous phase, subjecting said sodium chloride-containing aqueous phase to liquid-liquid countercurrent extraction with an organic solvent consisting essentially of diisopropyl ether in an extraction zone, thereby forming an extract phase consisting essentially of diisopropyl ether in admixture with phenol free of any substantial amount of water and a raffinate phase consisting essentially of aqueous sodium chloride in said extraction zone, passing said extract phase from said extraction zone to said precontacting zone to be used therein as said extract phase obtained within the system, and distilling phenol from said aqueous phase formed in said precontacting zone.

5. In a process for the separation of phenol from a dilute aqueous phenol solution wherein said solution is subjected to liquid-liquid countercurrent extraction with an organic solvent consisting essentially of diisopropyl ether under conditions resulting in the formation of an extract phase consisting essentially of diisopropyl ether in admixture with phenol free of any substantial amount of water and a raffinate phase consisting essentially of water free of any substantial amount of phenol, the improvement which comprises adjusting the hydrogen ion concentration of said aqueous phenol solution to a pH of from 5 to 9 and adding sodium chloride to said adjusted aqueous phenol solution in controlled amount to obtain a concentration of NaCl of from about 3 to about 20% by weight in said aqueous phenol solution prior to subjecting said aqueous phenol solution to said extraction.

6. The process for dephenolating an aqueous phenol solution which comprises, contacting said aqueous phenol solution in a precontacting zone with a diisopropyl ether-containing extract phase obtained within the system, thereby forming an organic phase consisting essentially of diisopropyl ether in admixture with phenol free of any substantial amount of water and an aqueous phase comprising water and phenol in said precontacting zone, adjusting the hydrogen ion concentration of said aqueous phase to a pH in the range of from 7 to 8.5, adding sodium chloride to said adjusted aqueous phase in a controlled amount to result in a concentration of sodium chloride in the range of from about 3 to about 20% by weight in said aqueous phase, subjecting said sodium chloride-containing aqueous phase to liquid-liquid countercurrent extraction with diisopropyl ether in an extraction zone, thereby forming an extract phase consisting essentially of diisopropyl ether in admixture with phenol free of any substantial amount of water and a raffinate phase consisting essentially of aqueous sodium chloride in said extraction zone, passing said extract phase from said extraction zone to said precontacting zone to be used therein as said extract phase obtained within the system, and distilling phenol from said aqueous phase formed in said precontacting zone.

7. The process in accordance with claim 6 wherein the hydrogen ion concentration of the charge to the process is initially adjusted to a pH in the range of from 5 to 9.

8. In a process for the separation of phenol from a dilute aqueous phenol solution wherein said solution is subjected to liquid-liquid countercurrent extraction with an organic solvent consisting essentially of diisopropyl ether under conditions resulting in the formation of an extract phase consisting essentially of diisopropyl ether in admixture with phenol free of any substantial amount of water and a raffinate phase consisting essentially of water free of any substantial amount of phenol, the improvement which comprises adjusting the hydrogen ion concentration of said aqueous phenol solution to a pH of from 5 to 9, and adding sodium chloride to said adjusted aqueous phenol solution in controlled amount to obtain a concentration of NaCl of from about 3 to about 20% by weight in said aqueous phenol solution prior to subjecting said aqueous phenol solution to said extraction.

9. The process in accordance with claim 8 wherein said aqueous salt-containing phenol solution is adjusted to a pH of from about 7 to about 8.5 before subjection to said extraction.

References Cited in the file of this patent

UNITED STATES PATENTS

| | | |
|---|---|---|
| 1,826,369 | Schoenburg et al. | Oct. 6, 1931 |
| 1,934,861 | Karpati et al. | Nov. 14, 1933 |
| 2,043,102 | Kester | June 2, 1936 |
| 2,199,786 | Dierichs et al. | May 7, 1940 |
| 2,288,281 | Huijser et al. | June 30, 1942 |

FOREIGN PATENTS

| | | |
|---|---|---|
| 716,886 | Great Britain | Oct. 13, 1954 |